United States Patent
Song et al.

(10) Patent No.: US 8,441,752 B1
(45) Date of Patent: *May 14, 2013

(54) DIBIT PULSE EXTRACTION METHODS AND SYSTEMS

(75) Inventors: Hongwei Song, Longmont, CO (US); Zining Wu, Los Altos, CA (US); Toai Doan, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 1663 days.

This patent is subject to a terminal disclaimer.

(21) Appl. No.: 11/844,090

(22) Filed: Aug. 23, 2007

Related U.S. Application Data (63) Continuation-in-part of application No. 11/840,682, filed on Aug. 17, 2007.

(60) Provisional application No. 60/823,984, filed on Aug. 30, 2006.

(51) Int. Cl.
*G11B 5/09* (2006.01)

(52) U.S. Cl.
USPC .................... 360/45; 360/25; 360/26; 360/65

(58) Field of Classification Search .................... None
See application file for complete search history.

(56) References Cited

U.S. PATENT DOCUMENTS

| | | | | |
|---|---|---|---|---|
| 5,781,358 | A * | 7/1998 | Hasegawa | 360/51 |
| 6,194,977 | B1 * | 2/2001 | Wang | 332/103 |
| 6,208,477 | B1 * | 3/2001 | Cloke et al. | 360/31 |
| 6,246,723 | B1 * | 6/2001 | Bliss et al. | 375/265 |
| 6,363,102 | B1 * | 3/2002 | Ling et al. | 375/147 |
| 6,934,100 | B2 * | 8/2005 | Ueno | 360/31 |
| 7,170,704 | B2 * | 1/2007 | DeGroat et al. | 360/53 |
| 7,720,179 | B2 * | 5/2010 | Li et al. | 375/326 |
| 7,760,821 | B2 * | 7/2010 | Cherubini et al. | 375/340 |
| 2002/0080898 | A1 * | 6/2002 | Agazzi et al. | 375/355 |
| 2003/0028833 | A1 * | 2/2003 | Coker et al. | 714/709 |
| 2006/0269018 | A1 * | 11/2006 | Li et al. | 375/343 |
| 2007/0047120 | A1 * | 3/2007 | DeGroat | 360/39 |
| 2008/0181292 | A1 * | 7/2008 | Yang et al. | 375/232 |

OTHER PUBLICATIONS

U.S. Appl. No. 11/840,682, filed Aug. 17, 2007.

* cited by examiner

*Primary Examiner* — Dismery Mercedes (57) ABSTRACT

A receiving device may be configured to derive an oversampled dibit pulse response estimate using symbols sampled at substantially the read channel symbol rate of the receiving device. The receiving device may include a data acquisition circuit configured to digitize data derived from a memory medium, as well as a dibit pulse estimation circuit configured to estimate the oversampled dibit pulse response using symbols sampled at the read channel rate of the receiving device.

39 Claims, 6 Drawing Sheets

DIBIT PULSE EXTRACTION METHODS AND SYSTEMS

INCORPORATION BY REFERENCE

This application claims priority under 35 U.S.C. §119(e) from U.S. Provisional Application Serial No. 60/823,984 entitled "Dibit Pulse Extraction," filed on Aug. 30, 2006; and is a continuation-in-part of U.S. Non-Provisional application Ser. No. 11/840,682 entitled "Dibit Pulse Extraction Methods and Systems," filed on Aug. 17, 2007, both of which are incorporated by reference herein in their entirety.

BACKGROUND

The manufacturers of magnetic hard-disk drives (HDDs) are constantly under pressure to increase both performance and data storage density. Unfortunately, HDDs having high linear recording densities tend to suffer from nonlinear distortions in their read/write channels, which may lead to significant performance degradation.

An approach used to identify such nonlinear distortion in HDDs is referred to as "dibit pulse extraction." As dibit pulse extraction may be used to identify nonlinear distortions, it may therefore be used to minimize their effects. For example, dibit pulse extraction may be used to estimate the appropriate channel equalization for an HDD that may be required to optimize the bit-error-rate (BER) performance of the HDD.

Current dibit pulse extraction techniques can require a sampling clock significantly higher than an HDD's read/write channel clock. Given that HDDs may have channel clocks running at a data rate 2 Gbps or higher, it may not be practical to implement the current dibit pulse extraction techniques into an HDD's read channel. Generally, a separate analyzer with very high sampling clock is used to measure an HDD's nonlinear distortions, which may be both expensive and time-consuming to implement via monolithic or hybrid integration.

SUMMARY OF THE DISCLOSURE

In various embodiments, a receiving device, such as an HDD, may be configured to estimate an oversampled dibit pulse response. The receiving device may include a data acquisition circuit configured to digitize data derived from a memory medium, as well as a dibit pulse estimation circuit configured to estimate the oversampled dibit pulse response using symbols sampled at substantially the read channel symbol rate of the receiving device. That is, instead of using a very high frequency sampling clock, a sampling device, such as a sample and hold circuit, may operate at the symbol-rate but the sampling phase may be shifted to controlled phase angles. A phase rotation and finite impulse response filter can eliminate the phase shift after the sampler so a symbol timing loop and read circuit, i.e., a closed-loop read circuit, is not perturbed. In this way, oversampling of a receiving device's dibit pulse response may be achieved without increasing sampling frequency or perturbing the closed-loop read circuit.

BRIEF DESCRIPTION OF THE DRAWINGS

The memory-related devices and methods are described with reference to the following figures, wherein like numerals reference like elements, and wherein.

DETAILED DESCRIPTION OF EMBODIMENTS

Figure 1:
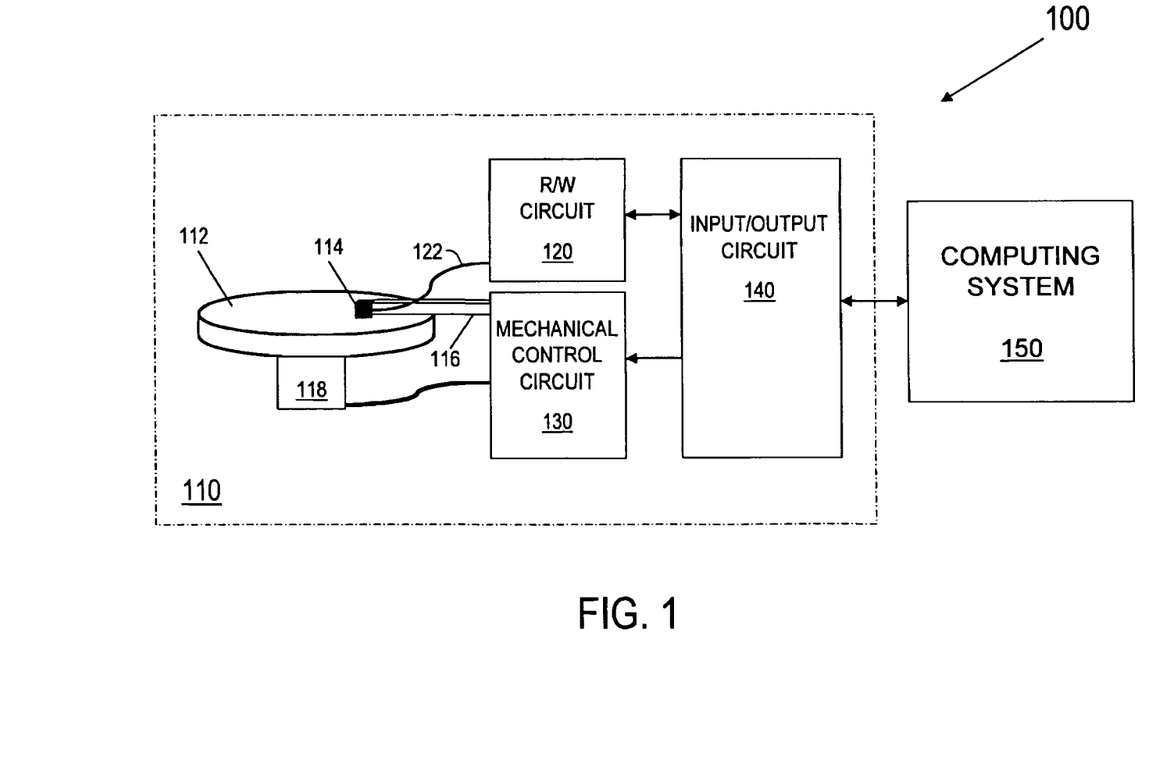
FIG. 1 is a block diagram of an exemplary data manipulation system.

FIG. 1 is a block diagram of an exemplary data manipulation system 100. As shown in FIG. 1, data manipulation system 100 includes a computing system 150 with a data storage system 110. The data storage system 110 includes a disk-shaped memory medium 112 spun by a motor 118 that may be written to and read from using transducer 114 held by armature 116. The data storage system 110 further includes a read/write circuit 120 coupled to transducer 114, a mechanical control circuit 130 coupled to both motor 118 and armature 116, and an input/output circuit 140. While a data storage system is discussed below by way of example and explanation, it should be appreciated that the channel estimation techniques discussed herein may be applied elsewhere, such as any number of communication systems having a receiving channel.

In operation, computing system 150 may store or retrieve data in data storage system 110 using any number of known or later developed commands and/or interface standards. For example, computing system 150 may retrieve data stored on memory medium 112 by issuing a command to input/output circuit 140 via a universal serial bus (USB) cable. In response, input/output circuit 140 may cause mechanical control circuit 130 to move transducer 114 to a specific location on memory medium 112, and further cause read/write circuit 120 to extract and forward data sensed by transducer 114, which then may be passed to computing system 150.

In order to improve the performance of data storage system 110, as well as the data storage density of memory medium 112, it may be useful to compensate for any inter-symbol interference (ISI) in the read channel of data storage system 110. Generally, compensating for ISI in data storage system 110 may require some form of channel estimation of its read channel.

Figure 2:
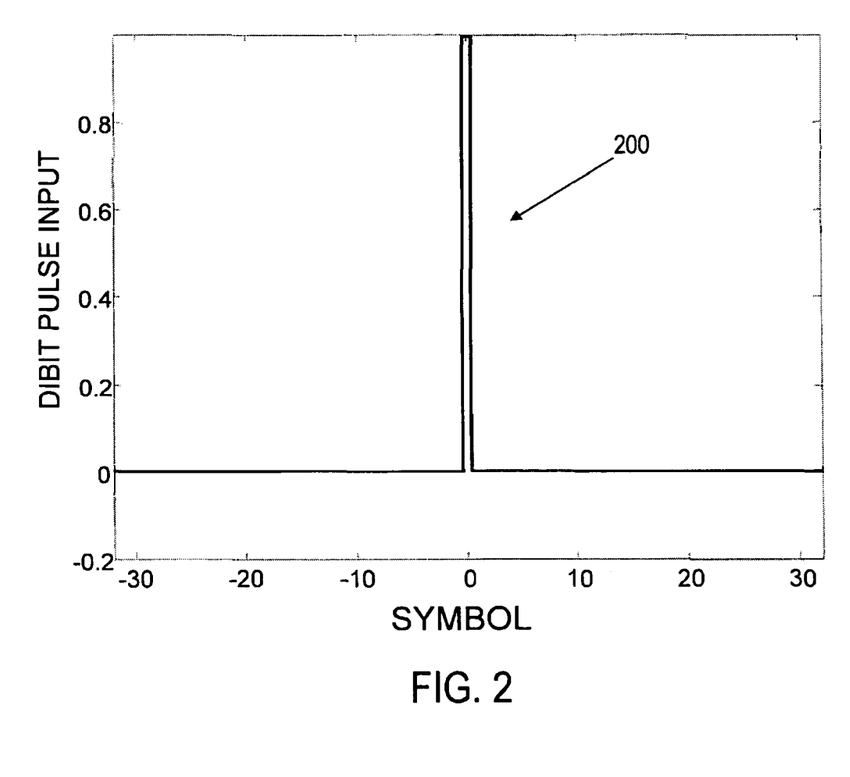
FIG. 2 is a timing diagram of an exemplary input dibit pulse.

One form of channel estimation is known in the art as "dibit pulse response extraction" or "dibit pulse response estimation." A dibit pulse may be thought of as two consecutive step responses, e.g., 0-to-1 and 1-to-0, typically separated by a single symbol length. FIG. 2 depicts an exemplary input dibit pulse signal 200 where a first data bit causes pulse signal 200 to rise from 0 to 1, and a second bit causes pulse signal 200 to fall from 1 to 0 after one symbol period. A response to an input dibit pulse can be called the dibit pulse response. In other words, a dibit pulse response is the response to a pair of transitions at minimum separation.

Figure 3:
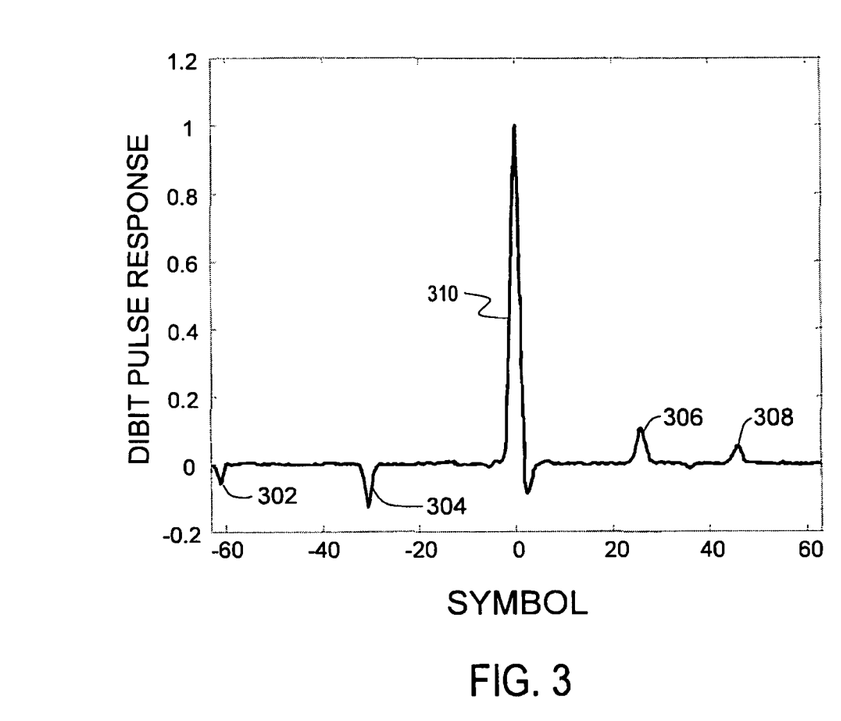
FIG. 3 is a timing diagram of an exemplary dibit pulse response for a read channel of the data storage device of FIG. 1.

Continuing to FIG. 3, an exemplary dibit pulse response 300 for the input dibit pulse signal 200 of FIG. 2 is depicted. As shown in FIG. 3, dibit pulse response 300 may include a large central pulse 310 with undershooting at the base of pulse 310, as well as a number of impairments or echoes 302, 304, 306 and 308 that can be caused by read channel effects, including nonlinear distortion, such as nonlinear transition shifts (NLTSs), overwrite distortion, and nonlinear bit interactions, and linear distortion, such as bandwidth limitations, spectral shape (i.e. peaks and valleys) and phase distortion. As may be recognized by one of ordinary skill in the art, the distortion of pulse 310 and impairments 302-308 may degrade the performance of a data storage device.

The effects of these impairments in a read channel may be eliminated or reduced by estimating the nonlinear and linear distortion of the read channel, then using the distortion estimates to compensate for these effects Generally, conventional approaches to estimating a dibit pulse response may involve the use of some form of expensive and specialized external instrumentation, which may need access to sensitive nodes within a read circuit. Such instrumentation may also need to digitize a stream of stored symbols at many times the read channel's symbol rate to provide an "oversampled", i.e., more thatn one sample per symbol, dibit pulse response estimate.

In contrast to traditional dibit pulse estimation techniques, the exemplary data storage system 110 may be configured to estimate an oversampled dibit pulse response of its read channel using specialized circuitry integrated within its internal read channel circuitry (not shown in FIG. 1) while sampling the read channel at the normal, i.e., operational, symbol rate of the data storage system and while not perturbing a symbol timing loop and read circuit. This may allow for increased performance at lower costs as no external instrumentation or higher-speed analog-to-digital converters (ADCs) may be required.

Figure 4:
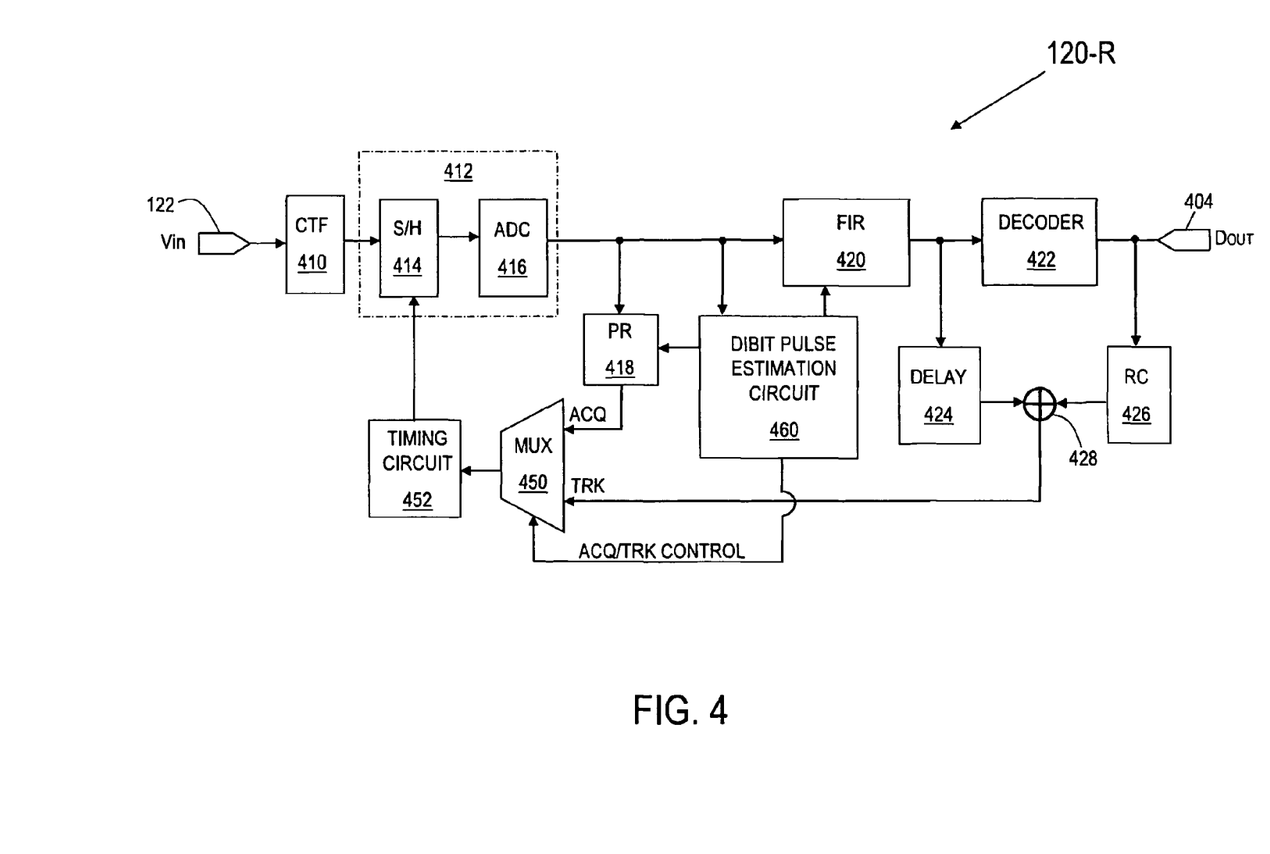
FIG. 4 is a block diagram of an exemplary closed-loop read circuit for use in the data storage device of FIG. 1 capable of estimating an oversampled dibit pulse response.

FIG. 4 is a block diagram of an exemplary read channel circuit 120-R having a closed-loop structure for use in the data storage device of FIG. 1 that is capable of estimating an oversampled dibit pulse response. As shown in FIG. 4, read channel circuit 120-R includes a continuous time filter (CTF) 410, a data acquisition system 412 having a sample and hold (S/H) circuit 414 and an ADC 416, a phase rotator (PR) circuit 418, a finite-impulse-response (FIR) filter 420, a decoder 422a delay circuit 424, a reconstruction circuit (RC) 426, a summing junction 428, a multiplexer (MUX) 450, a timing circuit 452, and a dibit pulse estimation circuit 460.

Read channel circuit 120-R may be described as having at least two different modes of operation including: (1) a normal/operational read mode where read channel circuit 120-R can be used to extract and export data from a memory medium, and (2) an estimation mode where read channel circuit 120-R may be used to estimate an oversampled dibit pulse response of its read channel.

During the normal read mode of operation, PR circuit 418 and dibit pulse estimation circuit 460 generally may not be used, or perhaps used in a way that has little or no effect on read channel circuit 120-R. As CTF 410, S/H circuit 414, ADC 416, PR circuit 418, FIR filter 420, decoder 422, delay circuit 424, RC 426, summing junction 428, MUX 450, and timing circuit 452 are known components in the relevant arts, their functionality will not be discussed except to the extent that they interact with PR circuit 418 and dibit pulse estimation circuit 460 in the estimation mode.

During the estimation mode of operation, an analog channel's signal, such as the signal from a magneto-resistive transducer, may be received by CTF 410 via node 122. CTF 410 may remove unwanted frequency components from the received signal to provide a filtered output signal to S/H circuit 414. S/14 circuit 414 may periodically sample the filtered signal, and ADC 416 may digitize the sampled signal provided by S/H circuit 414.

In various embodiments, it may be advantageous to estimate the dibit pulse response of the read channel using a special data sequence known as a maximal length pseudo-random bit sequence (PRBS). A PRBS is a sequence of bits that, while deterministic and repeatable, behaves statistically as a random bit sequence. A maximal length PRBS sequence for a q-bit long register contains $2^q-1$ states. For example, a 7 bit register can generate a maximal length PRBS sequence of states: 1 through 127; the all-zero state is excluded.

A PRBS can serve as a useful stimulus for measuring both linear and nonlinear distortion. A PRBS can be used to initialize or train an adaptive equalizer, and thus compensate ISI due to linear distortion. A cross-correlator can extract a system's dibit pulse response to a maximal length PRBS stimulus because the autocorrelation of a maximal length PRBS closely approximates an input dibit pulse.

In order to estimate the dibit pulse response of a read channel for a particular memory system, the PRBS may be first written to the memory system's storage medium. Subsequent reads of the PRBS may generate PRBS ADC samples that can be used to provide an advantageous signal from which to estimate the behavior of the read channel. Note that for non-storage related methods and systems, the PRBS may be transmitted from any number of transmitting devices to be received by some read channel, which may take any number of forms, such as a combination of optical conduits, transducers, amplifiers and electrical conduits.

While a single repetition of a PRBS on a storage medium may be sufficient, it may be desirable to write multiple copies of the PRBS in order to provide better read channel estimates. For example, by writing a 127-bit PRBS one-hundred times to a memory medium, and then reading and averaging the one-hundred received sample sets or PRBS ADC samples, the effects of random noise may be practically eliminated from the channel estimation process. Note that while practically any number of PRBS copies may be written, as will be explained below it may be useful to use powers of 2, i.e., $2^N=2, 4, 8, 16, 32, 64$ etc. in order to simplify processing and/or hardware. Still further, given that many devices read and write in sector-level increments, it may be advantageous to use as much of a memory medium's sector as possible. For example, for an HDD having a sector of 4,096 bits it may be useful to use a 127-bit PRBS repeated 32 times. In a communication channel setting, the PRBS may be transmitted and received to achieve channel estimation.

Periodic sampling can provide higher resolution or oversampling of a periodic signal. In periodic sampling, a repeating or periodic signal can stimulate a system and the sample phase can be adjusted to interrogate different parts of the system's response. The sampler can operate synchronously with the periodic signal so the same point in the response can be sampled at each repetition. In the case of a PRBS stimulus, the period is understood to be the sequence period, not the bit period. More than one sample can be taken per period If samples of a periodic signal are received at the symbol rate 1/T, where T is the sampling period, the samples of a response h(t) are h(kT) are h[k]. Naturally, h[k] represents h(t) only at the sample points, i.e. at a time resolution of T. The effective time resolution can be decreased, i.e. the effective sampling rate can be increased, to oversample the channel pulse response by sampling at various controlled phases. For example, if one set of samples is taken at zero phase (i.e., at t=kT), and a second set of samples is taken at 180 degrees phase (i.e., at t=(k+0.5)T), then interleaving the two sampled sequences can double the effectively sampling rate.

In an HDD example, during the estimation mode of operation, read circuit 120-R may be described as having two separate modes of operation for each read operation of a sector including: (1) an acquisition mode, and (2) a tracking mode. The mode of operation may be determined by the state of MUX 450, which may be controlled by dibit pulse estimation circuit 460 via multiplexer control signal A/T. During acquisition mode, the ACQ input to MUX 450 may be enabled such that the relevant control loop includes S/H circuit 414, ADC 416, PR circuit 418, MUX 450 and timing circuit 452. During tracking mode, the TRK input to MUX 450 may be enabled such that the relevant control loop includes S/H circuit 414, ADC 416, FIR 420, decoder 422, delay circuit 424, reconstruction circuit 426, summing junction 428, MUX 450 and timing circuit 452.

Before a sector is read, the ACQ input to MUX 450 may be enabled to initially configure read circuit 120-R in acquisition mode. Read circuit 120-R also may be configured to establish (and hold) a desired phase offset angle $\phi$ which incoming symbols are sampled by S/H circuit 414. Generally, the range of the phase offset angle $\phi$ of S/H circuit 414 may vary from 0 radians to $2\pi$ radians, i.e., it may be modulo-$2\pi$. The resolution of phase offset angle $\phi$ may be set such that $\phi=m\cdot 2\pi/N$ where N is a positive integer equal to a desired oversampling rate, and m can be an integer such that $0 \leq m < N$. For example, assuming that a four-fold oversampling is desired, N may be set to 4, and $\phi$ may be set to any of 0, $\pi/2$, $\pi$, and $3\pi/2$ radians.

In FIG. 4, the phase offset angle $\phi$ of S/H circuit 414 may be controlled using two sets of related parameters loaded into FIR 420 and PR circuit 418. For example, a first set of FIR parameters $\{a_{00}, a_{01}, a_{02} \ldots a_{0K}\}$ and PR parameters $\{b_{00}, b_{01}, b_{02} \ldots b_{0L}\}$ may be respectively loaded into FIR 420 and PR circuit 418 to cause S/H circuit 414 to sample at phase offset angle $\phi=0$ radians, a second set of FIR parameters $\{a_{10}, a_{11}, a_{12} \ldots a_{1K}\}$ and PR parameters $\{b_{10}, b_{11}, b_{12} \ldots b_{1L}\}$ may be respectively loaded into FIR 420 and PR circuit 418 to cause S/H circuit 414 to sample at phase offset angle $\phi=\pi/2$ radians, and so on. In an exemplary case, the FIR parameters can be 10 FIR filter coefficients, i.e., K=9, and the PR parameters can be 2 digital filter coefficients, i.e., L=1, thus implementing a 2-tap digital filter. In an exemplary case, when the dibit pulse estimation circuit 460 adjusts the FIR 420 and PR circuit 418 coefficients from their initial values, i.e. from their values when $\phi$ equals 0 radians, the new FIR 420 and PR circuit 418 coefficients can change the fractional tap delay to phase compensate the tracking and acquisition loops equally.

When the phase offset angle $\phi$ is initialized to 0 radians, FIR 420 and PR circuit 418 are appropriately configured, and MUX 450 is initialized so as to pass the ACQ signal from PR circuit 418 to timing circuit 452, then a sector can be read and the estimation process can start. An analog signal derived from a sensor, such as a magneto-resistive sensor, can then be received by CTF 410 via node 122. The CTF 410 may remove unwanted frequency components from the received signal to provide a filtered output signal to S/H circuit 414. S/H circuit 414 may periodically sample the filtered signal, and ADC 416 may digitize the sampled signal provided by S/H circuit 414.

As incoming signals are sampled and digitized, timing circuit 452 may be synchronized to the read symbol rate and to the desired phase offset angle $\phi=0$ well before PRBS ADC samples are presented to read circuit 120-R. After timing circuit 452 is appropriately synchronized, read circuit 120-R may switch from acquisition mode to tracking mode. Upon entering tracking mode, any phase offset angle $\phi$ at the output of ADC 416 may be compensated by FIR 420 such that decoder 422 effectively receives a signal having no phase offset. In other words, FIR 420 can perform phase compensation or act as a phase compensator. Accordingly, read circuit 120-R may continue to receive data while timing circuit 452 maintains the desired frequency and phase offset.

As PRBS ADC samples are received, sampled, digitized and processed by the read circuit's tracking loop, dibit pulse estimation circuit 460 may receive the PRBS ADC samples and process them to estimate a dibit pulse response for phase offset angle $\phi=0$.

After the dibit pulse response for phase offset angle $\phi=0$ is estimated, read circuit 120-R may repeat the process for subsequent phase offset angles, then interleave the various individual dibit pulse response estimates to create an oversampled dibit pulse response estimate.

Note that while exemplary read circuit 120-R is applied to a data storage device, e.g., a magnetic HDD, many of the same concepts may be applied to certain communications systems. That is, while the exemplary embodiments of the present disclosure have particular applicability to HDDs and other memory storage devices, their functionality is not limited solely thereto. For example, in various embodiments read circuit 120-R may be applied to resolving ISI issues in a communications system where the read channel may take the form of a twisted-wire pair (or some other communications medium) and data packets may replace HDD sectors.

Figure 5:
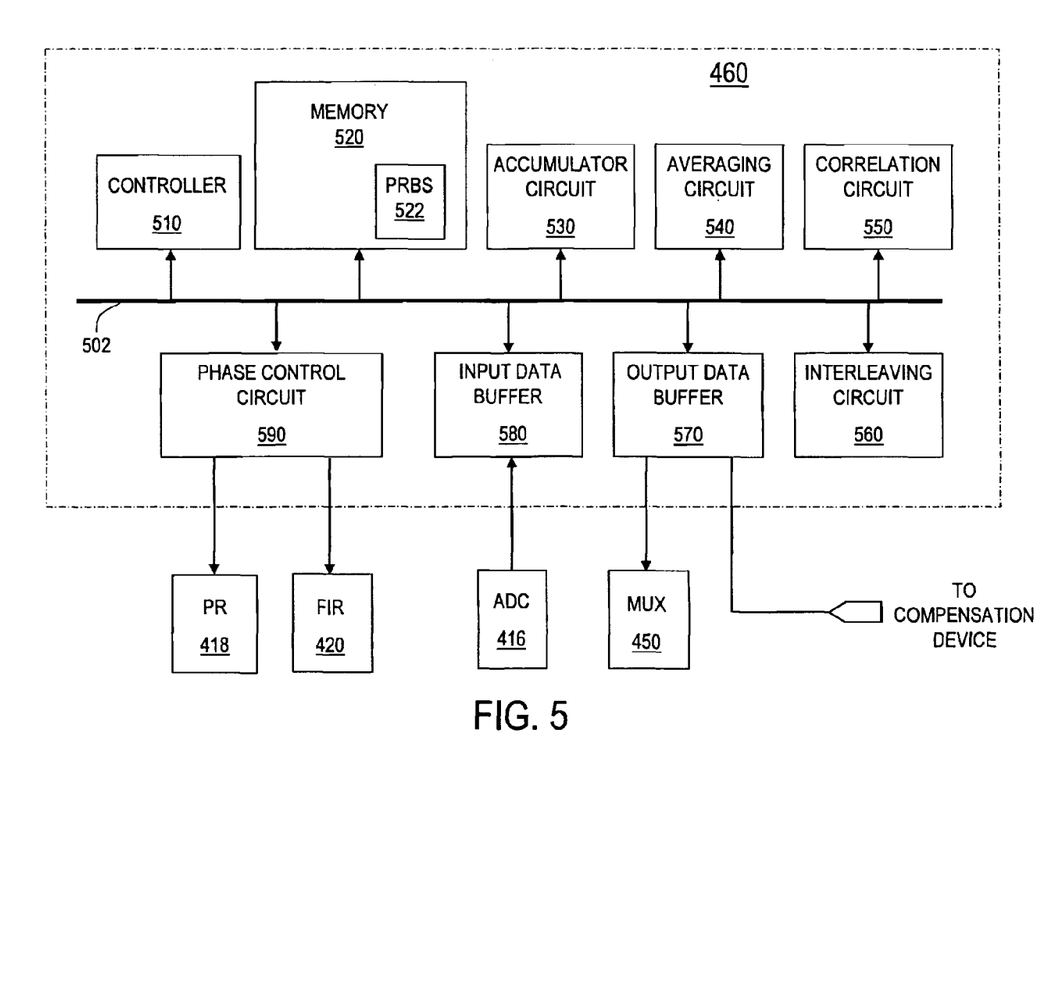
FIG. 5 is a block diagram of the exemplary dibit pulse estimation circuit of FIG. 4.

FIG. 5 is a block diagram of an exemplary embodiment of dibit pulse estimation circuit 460. As shown in FIG. 5, dibit pulse estimation circuit 460 includes a controller 510, a memory 520 having a pseudo-random bit sequence (PRBS) 522 stored within, an accumulator circuit 530, an averaging circuit 540, a correlation circuit 550, an interleaving circuit 560, an output data buffer 570, an input data buffer 580 and a phase-control circuit 590. The various components 510-590 are coupled together via control/data bus 502.

Although the exemplary embodiment of dibit pulse estimation circuit 460 uses a bussed architecture, it should be appreciated that any other architecture may be used as is well known to those of ordinary skill in the art. For example, in various embodiments, components 510-590 may take the form of separate electronic components coupled together via a series of separate busses or specialized interfaces. It also should be appreciated that some of the above-listed components may take the form of software/firmware routines residing in memory 520 to be executed by controller 510, or even software/firmware routines residing in separate memories to be executed by different controllers. Also note that while PRBS 522 may be stored in memory 520, in other embodiments PRBS 522 may be generated by controller 510, by some dedicated logic or received from an external device as may be found advantageous.

In operation and under control of controller 510, phase control circuit 590 may be set for a first phase offset angle (typically $\phi=0$). Phase control circuit 590 may cause both PR circuit 418 and FIR 420 to use respective sets of parameters suitable to the first phase offset angle such that S/H circuit 414 of FIG. 4 may sample at the first phase offset angle.

MUX 450 may also be set to enable read circuit 120-R to operate in acquisition mode. As read circuit 120-R of FIG. 4 synchronizes to the appropriate symbol rate and phase offset angle, MUX 450 then may be reset to enable read circuit 120-R to operate in tracking mode.

Received or PRBS ADC samples of a response to a PRBS stimulus written to memory medium 112 (of FIG. 1) may be provided the input data buffer 580 from ADC 416. The PRBS ADC samples may be placed in memory 520 or directly in accumulator circuit 530. The PRBS ADC samples may be added and stored in respective memory locations within accumulator circuit 530 to integrate the response, which may include impairments, while not integrating random noise that is uncorrelated with the PRBS stimulus. For example, if a 127 bit PRBS stimulus is repeated 32 times for a single phase offset, the corresponding PRBS ADC samples of each repetition can be added together to produce a set of 127 sums. These sums can be called the accumulated or integrated dibit pulse response for the given phase offset Note that the minimum word size of each location of accumulator circuit 530 may be determined by the PRBS ADC sample sets read and the resolution of ADC 416. For example, if ADC 416 has an output resolution of 6 bits and 32 ($=2^5$) PRBS ADC sample sets are read, then each location of accumulator circuit 530 should have at least 11 bits to avoid possible loss of data. While exemplary accumulator circuit 530 uses internal memory locations to accumulate and store data, in various other embodiments accumulator circuit 530 may use memory 520 to store individual incoming samples and/or its sequence of sums.

Once the accumulator circuit 530 has accumulated the appropriate number of PRBS ADC samples, the sum of each location within accumulator circuit 530 may be averaged by averaging circuit 540. While in some embodiments averaging circuit 540 may be a divider, in embodiments where $2^N$ ($=2, 4, 8, 16, 32 \ldots$) PRBS ADC samples are used, averaging circuit 540 may truncate the appropriate number of lower bits, thereby retaining the most significant bits. For instance, using the example above with the 11-bit accumulator circuit 530 and assuming that 6-bit resolution is desired, averaging circuit 540 may extract only the most significant six bits of each entry while ignoring the least significant five bits. Note that the averaged PRBS sequence produced by averaging circuit 540 may be representative of a single, relatively noise-free set of PRBS ADC samples.

Next, correlation circuit 550 may perform a time-domain correlation process (or an equivalent frequency-domain correlation process) on the averaged PRBS sequence produced by averaging circuit 540 using PRBS 522 located in memory 520. The product of this correlation process may be a 127-bit dibit pulse estimate of the read channel for a phase offset angle of $\phi=0$. This 127-bit dibit pulse estimate for $\phi=0$ may then be stored in interleaving circuit 560 to await further processing.

Phase control circuit 590 may be set to a second phase offset angle (e.g. $\phi=\pi/2$ radians), and phase control circuit 590 may cause PR circuit 418 and FIR 420 to use second sets of respective parameters suitable to the second phase offset angle. The same PRBS ADC samples (or an equivalents set of PRBS ADC samples in another location) used for the first phase offset angle ($\phi=0$ radians) may then be re-sampled by S/H circuit 414, digitized by ADC 416, fed to input data buffer 580 by ADC 416, and placed in memory 520 or accumulator circuit 530. Averaging circuit 540 and correlation circuit 550 may then derive a second 127-bit dibit pulse estimate, which may be interleaved with the first 127-bit dibit pulse estimate by interleaving circuit 560.

The process may then be repeated as necessary until interleaving circuit 560 (or a buffer memory controlled by interleaving circuit 560) holds an oversampled dibit pulse response estimate. For instance, using the examples above where N=4 such that $\phi=\{0, \pi/2, \pi, 3\pi/2\}$ and the PRBS is 127 bits long, interleaving circuit 560 may effectively produce a four-fold (508 point) oversampled dibit pulse response estimate while sampling PRBS data sampled at the symbol rate of the read channel. Note that while a single PRBS may be used for all phase offset angle values, in various embodiments it may be possible to use a different PRBS for each phase offset angle. For example, a first PRBS may be used for $\phi=0$ while a second PRBS may be used for $\pi/2$, $\pi$ and $3\pi/2$.

Once an appropriate oversampled dibit pulse response estimate is derived, dibit pulse estimation circuit 460 can, via output data buffer 570, export the oversampled dibit pulse response estimate to any number of impairment compensation devices, such as a precompensation circuit, an erase circuit, a write current waveform circuit, a read head height circuit, an equalizer such as a decision feedback equalizer (DFE), a mean square error (MSE) equalizer, a least mean square (LMS) equalizer, an adaptive transversal filter, a Kalman filter, a least-squares or gradient lattice filter, Viterbi decoder, and the like.

Figure 6:
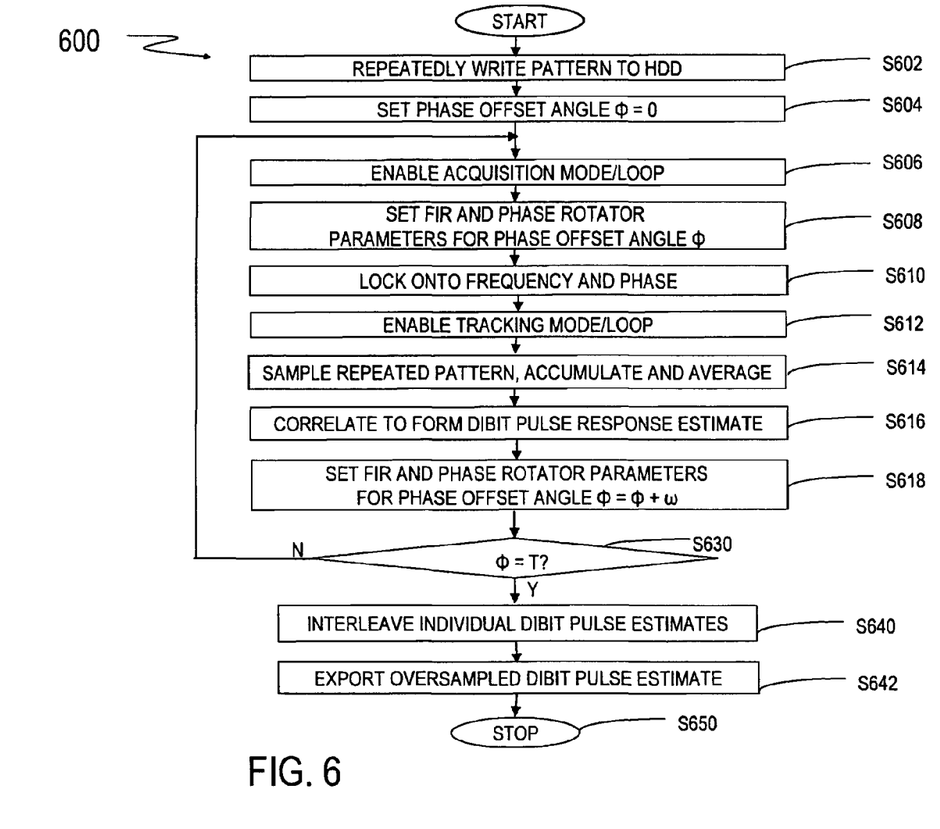
FIG. 6 is a flowchart outlining an exemplary process for estimating a dibit pulse response for a data storage device.

FIG. 6 is a flowchart outlining an exemplary process for estimating an oversampled dibit pulse response for a read channel of a magnetic HDD or other data storage device used as an example. The process starts in step S602 where one or more copies of a maximal-length PRBS are written to the memory medium of the data storage device, and the process can goto step S604. In step S604, a system phase offset angle at which symbols are to be sampled can be set to $\phi=0$. As discussed above the effective oversampling rate N may determine the appropriate phase offset angular resolution. That is, for any oversampling rate N, phase offset angle $\phi$ may be set to $m \cdot 2\pi/N$ where m is an integer such that $0 \leq m < N$. The process can then go to step S606.

In step S606, the read circuitry receiving the PRBS ADC samples may be set to acquisition mode, and control can go to step S608. In step S608, a phase rotator (PR) circuit and FIR controlling the phase offset angle during acquisition and tracking modes may be set with the appropriate parameters such that the PR circuit may cause incoming symbols to be sampled at the phase offset angle during acquisition mode while the FIR may compensate for the phase offset angle during tracking mode, and the process can go to step S610.

In step S610, the read circuitry receiving the PRBS ADC samples may be locked onto the desired symbol frequency and phase offset angle, and control can go to step S612. In step S612, the read circuitry receiving the PRBS ADC samples may switch from acquisition mode to tracking mode such that the PR circuit is effectively disabled while the FIR is used to compensate for the phase offset angle, and control can go to step S614.

In step S614, the one or more PRBS ADC samples may be read based on the phase offset angle $\phi$, after which the PRBS ADC samples may be accumulated and averaged, and the process can go to step S616. In step S616, the averaged PRBS may be correlated with the PRBS sequence to form a dibit pulse response estimate, and the process can go to step S618.

In step S616, the phase offset angle may be incremented to $\phi=\phi+\omega$, where $\omega=2\pi/N$, and the PR circuit and FIR may be set using a next set of appropriate parameters such that the PR circuit may cause incoming symbols to be sampled at the updated phase offset angle during acquisition mode while the FIR may compensate for the updated phase offset angle during tracking mode, and the process can go to step S630.

In step S630, a determination is made as to whether $\phi=$symbol length T, i.e., whether all the individual dibit pulse response estimates have been derived for all unique values of $\phi$. If all the individual dibit pulse response estimates have been derived for all unique values of $\phi$, then the process can go to step S642; otherwise the process can go back to step S606.

In step S640, the individual dibit pulse response estimates may be interleaved to form an N-fold (Nx) oversampled dibit pulse estimate, and the process can go to step S642. In step S642, the oversampled dibit pulse estimate may be exported to an appropriate compensation device, and the process can go to step S650 where the process stops.

In various embodiments where the above-described systems and/or methods are implemented using a programmable device, such as a computer-based system or programmable logic, it should be appreciated that the above-described systems and methods can be implemented using any of various known or later developed programming languages, such as C, C++, FORTRAN, Pascal, VHDL and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions.

While the disclosed methods and systems have been described in conjunction with exemplary embodiments, these embodiments should be viewed as illustrative, not limiting. Various modifications, substitutes, or the like are possible within the spirit and scope of the disclosed methods and systems.

What is claimed is:

1. A receiving device, comprising:
    a data acquisition circuit configured to digitize symbol data received from a data channel;
    a dibit pulse estimation circuit coupled to an output of the data acquisition circuit and configured to estimate an oversampled dibit pulse response using symbol data sampled at substantially a symbol rate of the receiving device, the dibit pulse estimation circuit including:
        a correlation circuit configured to correlate one or more received sample sequences from the data acquisition circuit with a reference pseudorandom bit sequence to generate a first dibit pulse response estimate;
        an interleaving circuit configured to interleave the first dibit pulse response estimate with one or more other dibit pulse response estimates; and
        an averaging circuit configured to average the one or more received sample sequences from the data acquisition circuit to create a first averaged sample sequence, and the correlation circuit correlates the first averaged sample sequence with a copy of the reference pseudorandom bit sequence to generate the first dibit pulse response estimate; and
    a phase rotation circuit coupled to receive digitized symbol data from the output of the data acquisition circuit and configured to generate the oversampled dibit pulse response without increasing sampling frequency.

2. The receiving device of claim 1, wherein the dibit pulse estimation circuit is configured to estimate multiple dibit pulse responses each derived using a different sampling phase.

3. The receiving device of claim 1, wherein the phase rotation circuit is coupled to the data acquisition circuit within a timing acquisition loop.

4. The receiving device of claim 3, wherein the data acquisition circuit is incorporated both within the timing acquisition loop and a tracking loop.

5. The receiving device of claim 3, wherein the phase rotation circuit is configured to change a phase offset angle at which the data acquisition circuit samples received symbols.

6. The receiving device of claim 5, further comprising a timing circuit coupled to the data acquisition circuit and configured to control the data acquisition circuit based on a signal provided by the phase rotation circuit.

7. The receiving device of claim 6, further comprising a multiplexer embedded within the timing acquisition loop for enabling and disabling the timing acquisition loop.

8. The receiving device of claim 5, further comprising a compensation circuit coupled to the output of the data acquisition circuit and configured to compensate for changes in phase offset angle sampling of the data acquisition circuit.

9. The receiving device of claim 8, wherein the compensation circuit is integrated into a finite impulse response filter.

10. The receiving device of claim 9, wherein the finite impulse response filter is coupled to the data acquisition circuit within a tracking loop.

11. The receiving device of claim 10, further comprising a multiplexer embedded within the tracking loop and configured to enable and disable the tracking loop.

12. The receiving device of claim 1, wherein the correlation circuit is further configured to correlate multiple received copies of the sample sequence from the data acquisition circuit with the reference pseudorandom bit sequence to generate the first dibit pulse response estimate.

13. The receiving device of claim 1, wherein the averaging circuit includes:
    an adding circuit configured to add respective bit samples of the multiple sets of the pseudorandom bit sequence to create a first accumulated pseudorandom bit sequence; and
    a first circuit for determining the first averaged bit sequence from the first accumulated pseudorandom bit sequence.

14. A communications system incorporating the receiving device of claim 13.

15. A computing system incorporating the receiving device of claim 1.

16. The receiving device of claim 1, wherein the receiving device is incorporated into a read channel of a memory storage device.

17. The receiving device of claim 16, wherein the memory storage device is a magnetic hard disk system.

18. The receiving device of claim 16, wherein the oversampled dibit pulse response is estimated using a pseudorandom bit sequence stored on the memory storage device 19. The receiving device of claim 16, wherein the oversampled dibit pulse response is estimated using multiple copies of the pseudorandom bit sequence on the memory storage device.

20. The receiving device of claim 19, wherein the multiple copies of the pseudorandom bit sequence occupy substantially all of a data sector of the memory storage device.

21. The receiving device of claim 19, wherein the memory storage device has $2^N$ copies of a 127-bit pseudorandom bit sequence stored thereon, wherein N is a positive integer.

22. A receiving device, comprising:
    data acquisition means for sampling data received from a data channel;
    estimation means coupled to the data acquisition means for estimating an oversampled dibit pulse response using symbols sampled at substantially a symbol rate of the receiving device, the estimation means including:
        a correlation means for correlating one or more received sample sequence from the data acquisition means with a reference pseudorandom bit sequence to generate a first dibit pulse response estimate;
        an interleaving means for interleaving the first dibit pulse response estimate with one or more other dibit pulse response estimates; and an averaging means for averaging the multiple received sample sequences from the data acquisition means to create a first averaged sample sequence, and the correlation means correlates the first averaged sample sequence with a copy of the reference pseudorandom bit sequence to generate the first dibit pulse response estimate; and phase rotation means for receiving sampled data from the data acquisition means and generating the oversampled dibit pulse response without increasing sampling frequency.

23. The receiving device of claim 22, wherein the phase rotation means causes a change in a phase offset angle at which the data acquisition means samples symbol data.

24. The receiving device of claim 23, further comprising compensation means coupled to an output of the data acquisition means for compensating for phase offset angle sampling changes.

25. The receiving device of claim 23, wherein the correlation means correlates an averaged pseudorandom bit sequence derived from multiple copies of a received pseudorandom bit sequence with a reference copy of the pseudorandom bit sequence.

26. The receiving device of claim 23, wherein the estimation means further includes interleaving means for interleaving multiple dibit pulse response estimates.

27. A computing system incorporating the receiving device of claim 22.

28. A magnetic disk drive incorporating the receiving device of claim 22.

29. A memory system, comprising:
a non-transitory memory medium having multiple copies of a pseudorandom bit sequence stored thereon;
a closed-loop read circuit coupled to the memory medium via a read channel, the closed-loop read circuit including:
a data acquisition circuit configured to digitize multiple received copies of the pseudorandom bit sequence received via the read channel;
a phase rotation circuit that receives digitized symbol data from the data acquisition circuit and configured to rotate a phase offset angle at which the data acquisition circuit samples the multiple received copies of the pseudorandom bit sequence and to generate an oversampled dibit pulse response estimate without increasing sampling frequency;
a compensation circuit coupled to an output of the data acquisition circuit and configured to compensate for changes in phase offset angle sampling of the data acquisition circuit;
a correlation circuit configured to correlate an average pseudorandom bit sequence derived from multiple received copies of the pseudorandom bit sequence from the data acquisition circuit with a reference copy of the pseudorandom bit sequence for multiple phase offset angles to produce multiple dibit pulse response estimates; and
an interleaving circuit, coupled to the correlation circuit, configured to interleave the multiple dibit pulse response estimates to produce the oversampled dibit pulse response estimate; and
an averaging circuit configured to average the multiple received copies of the pseudorandom bit sequence from the data acquisition circuit to create a first averaged sample sequence, and the correlation circuit correlates the first averaged sample sequence with a copy of the reference pseudorandom bit sequence copy to generate a dibit pulse response estimate.

30. The memory system of claim 29, wherein the non-transitory memory medium is a magnetic hard disk.

31. A computing system incorporating the memory system of claim 29.

32. A method for estimating a dibit pulse response of a data channel, comprising:
first sampling one or more copies of a pseudorandom bit sequence received by a data acquisition circuit via the data channel at a read symbol rate using a first phase offset angle to produce a first sampled output;
estimating a first dibit pulse response using the first sampled output; and
deriving, by a phase rotation circuit, an oversampled dibit pulse response estimate using the first estimated dibit pulse response without increasing sampling frequency;
correlating one or more received sample sequences from the data acquisition circuit with a reference pseudorandom bit sequence to generate a first dibit pulse response estimate;
interleaving the first dibit pulse response estimate with one or more other dibit pulse response estimates; and
averaging the one or more received sample sequences to create a first averaged sample sequence and correlating the first averaged sample sequence with a copy of the reference pseudorandom bit sequence to generate the first dibit pulse response estimate.

33. The method of claim 32, further comprising:
second sampling the one or more copies of a pseudorandom bit sequence received via the data channel at the read symbol rate using a second phase offset angle to produce a second sampled output, the second phase offset angle being different from the first phase offset angle; and
estimating a second dibit pulse response using the second sampled output, wherein the oversampled dibit pulse response estimate is derived using the second estimated dibit pulse response.

34. The method of claim 33, further comprising:
third sampling the one or more copies of a pseudorandom bit sequence received via the data channel at the read symbol rate using a third symbol phase offset angle, the third phase offset angle being different from the first and second phase offset angles; and
estimating a third dibit pulse response using the third sampled output, wherein the oversampled dibit pulse response is derived using the third dibit pulse response.

35. The method of claim 33, further comprising compensating for sampling pseudorandom bit sequence copies while using a non-zero symbol phase offset angle.

36. The method of claim 33, further comprising interleaving the first estimated and second estimated dibit pulse responses.

37. The method of claim 33, wherein the step of first sampling includes sampling multiple copies of a pseudorandom bit sequence.

38. The method of claim 37, wherein the step of estimating the first dibit pulse response includes:
averaging the multiple sampled copies of the pseudorandom bit sequence of the first sampling to create a first averaged sequence; and
correlating the first averaged sequence with a reference pseudorandom bit sequence.

39. The method of claim 33, wherein the step of deriving the oversampled dibit pulse response estimate further comprises interleaving the first estimated and second estimated dibit pulse responses.

* * * * *